No. 685,015. Patented Oct. 22, 1901.
S. K. TODD.
PISTON.
(Application filed Jan. 29, 1901.)
(No Model.)
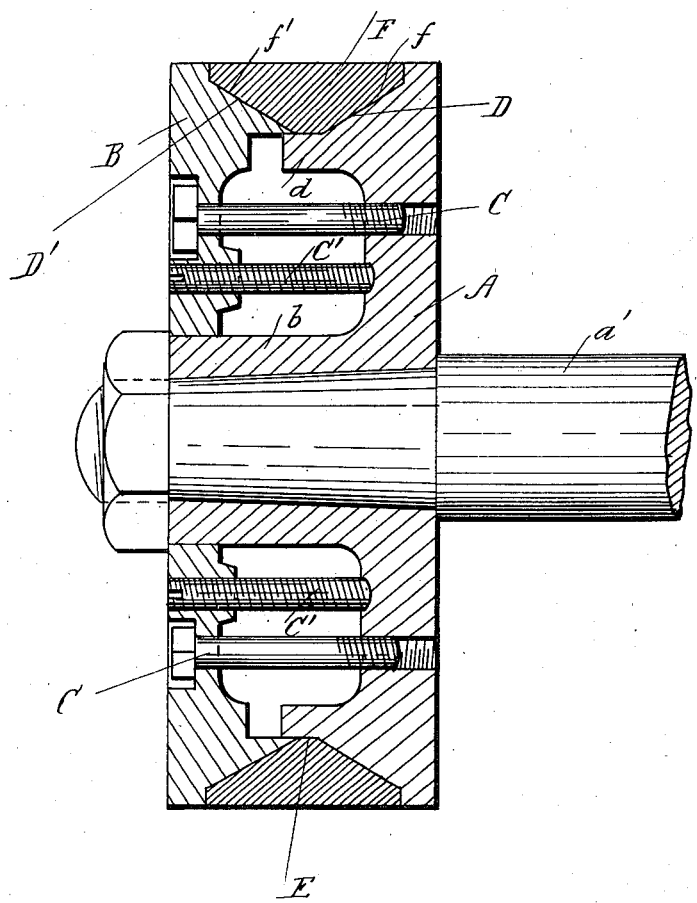
WITNESSES
Walter Allen
Geo. M. Copenhaver
INVENTOR
Samuel K. Todd
by Herbert W. T. Jenner
Attorney

UNITED STATES PATENT OFFICE.

SAMUEL K. TODD, OF CAYUGA, INDIANA.

PISTON.

SPECIFICATION forming part of Letters Patent No. 685,015, dated October 22, 1901.

Application filed January 29, 1901. Serial No. 45,243. (No model.)

*To all whom it may concern:*

Be it known that I, SAMUEL K. TODD, a citizen of the United States, residing at Cayuga, in the county of Vermilion and State of Indiana, have invented certain new and useful Improvements in Pistons; and I do hereby declare the following to be a full, clear, and exact description of the invention, such as will enable others skilled in the art to which it appertains to make and use the same.

This invention relates to pistons; and it consists in the novel construction and combination of the parts hereinafter fully described and claimed.

In the drawing the figure is a longitudinal section through the piston.

A is the body portion of the piston, which is secured to a piston-rod $a'$ in any approved manner.

B is the piston-follower, which is adjustable with respect to the body portion of the piston. The follower B is preferably slidable on the hub $b$ of the body portion A.

C represents bolts or screws which couple together the follower and the body portion and which draw them together when tightened up.

C' represents screwed stud-bolts which adjust the position of the follower with respect to the body portion and which prevent them from being drawn too close together. The studs also form a lock for the draw-bolts and prevent them from becoming loose. These bolts and screws are arranged in any approved manner in carrying out this invention, and the number of them is varied according to the size of the piston.

The body portion A has a cone D and a flange $d$, which projects from the smaller end of the cone D toward the follower. The follower B has a cone D' similar to the cone D but facing in the opposite direction, and the cone D' is slidable over the flange $d$. The two cones D and D' together form a groove E in the periphery of the piston.

F is a packing-ring of antifriction metal, such as Babbitt metal, which may be stretched or extended. The ring F is made to fit the cylinder in which the piston works, and it has double conical surfaces $f f'$ on its under side, corresponding in inclination with the cones D and D'. The packing-ring F is arranged in the groove E and is forced into contact with the cylinder by moving the follower toward the body portion of the cylinder. The packing-ring is stretched or expanded to fit the cylinder from time to time as it becomes worn.

What I claim is—

1. In a piston, the combination, with a body portion provided with a cone near its periphery and a central hub, of a follower portion also provided with a cone near its periphery and slidable on the said hub leaving the end thereof uncovered, a packing-ring seated on the said cones, and means for adjusting and locking the said follower portion independent of the piston-rod, substantially as set forth.

2. In a piston, the combination, with a body portion provided with a cone near its periphery, a flange projecting from the smaller end of the cone, and a central hub; of a follower portion also provided with a cone near its periphery which slides upon the said flange, said follower being slidable on the said hub, a packing-ring seated on the said cones, a piston-rod secured to the said hub independent of the follower portion, and means for adjusting and locking the said follower portion independent of the piston-rod, substantially as set forth.

In testimony whereof I affix my signature in presence of two witnesses.

SAMUEL K. TODD.

Witnesses:
WM. DUNKERLY,
JOHN D. TODD.